May 28, 1935. W. K. ECKHARD 2,002,853
GRIPPER MECHANISM
Filed Oct. 2, 1931 2 Sheets-Sheet 2
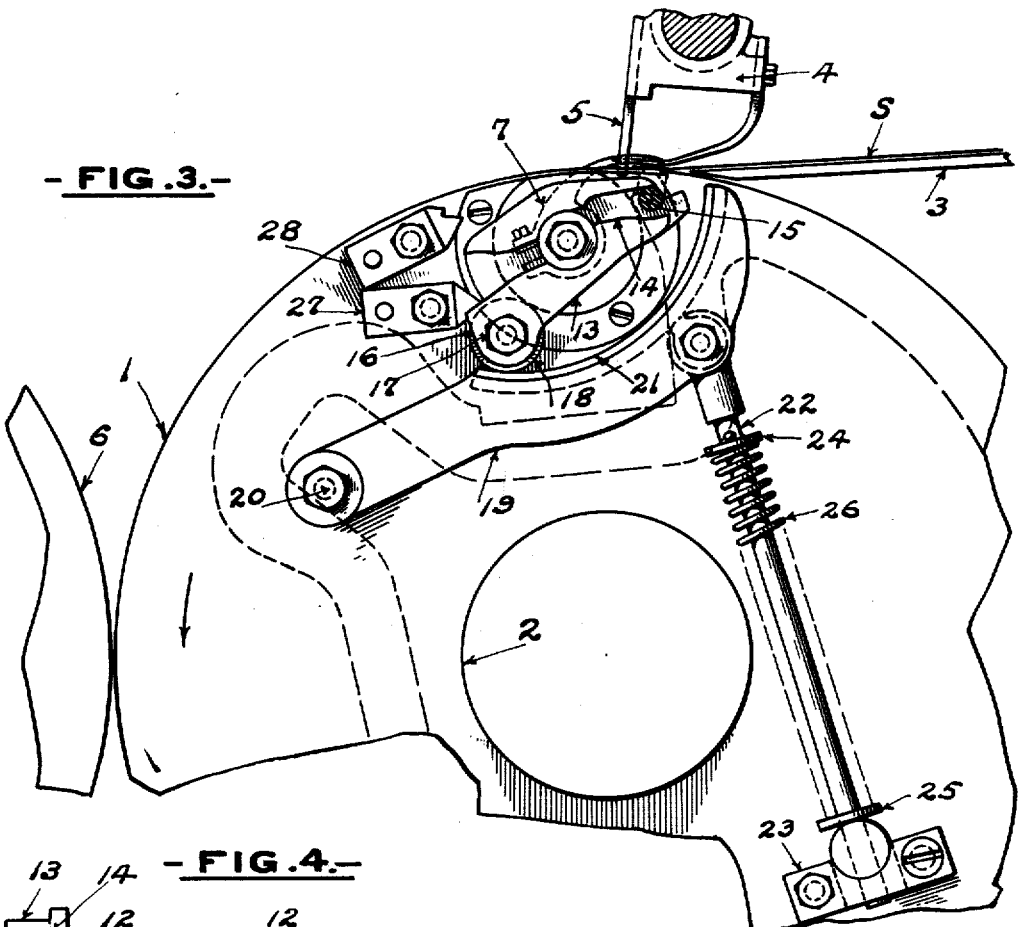
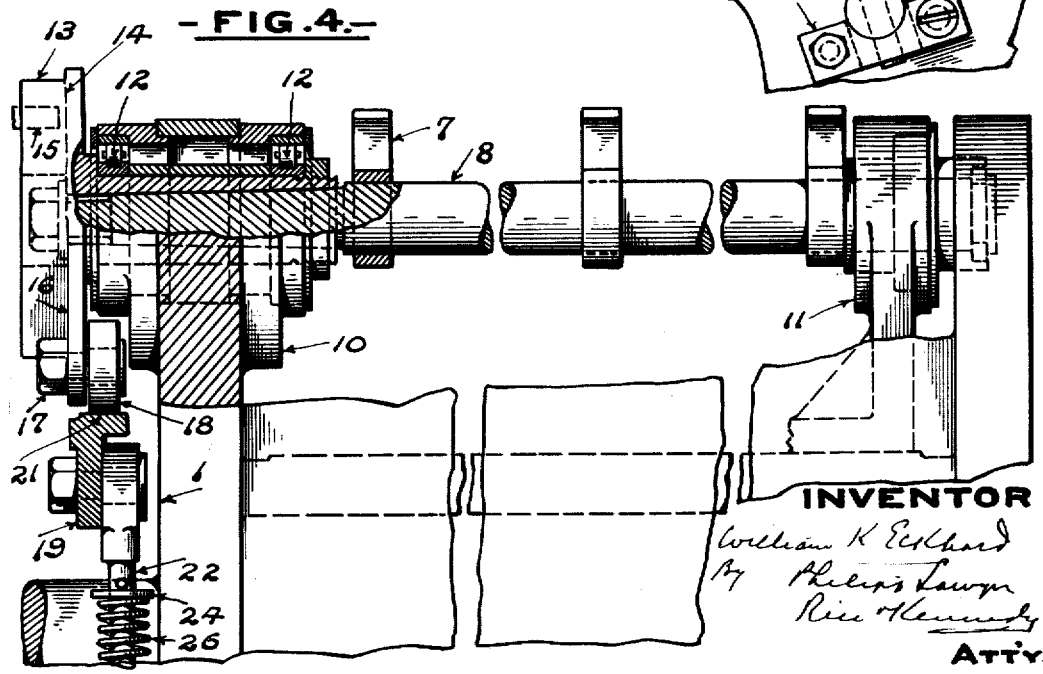
INVENTOR
William K Eckhard
By Philip Lawyer
Rice & Kennedy
ATTY.

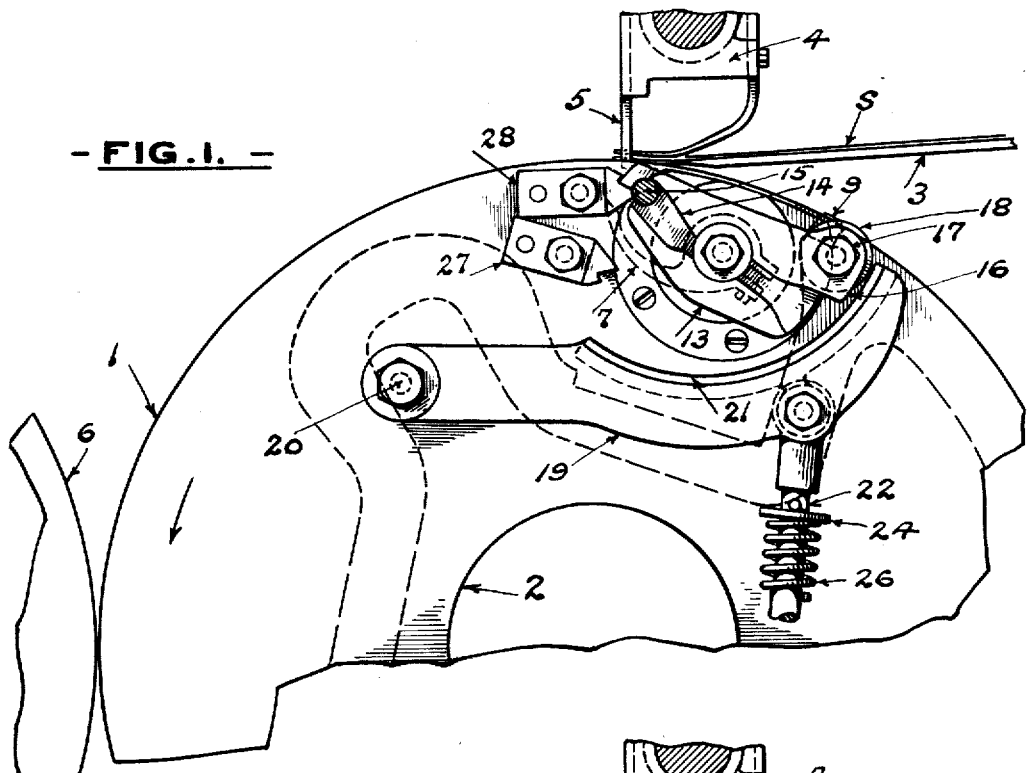
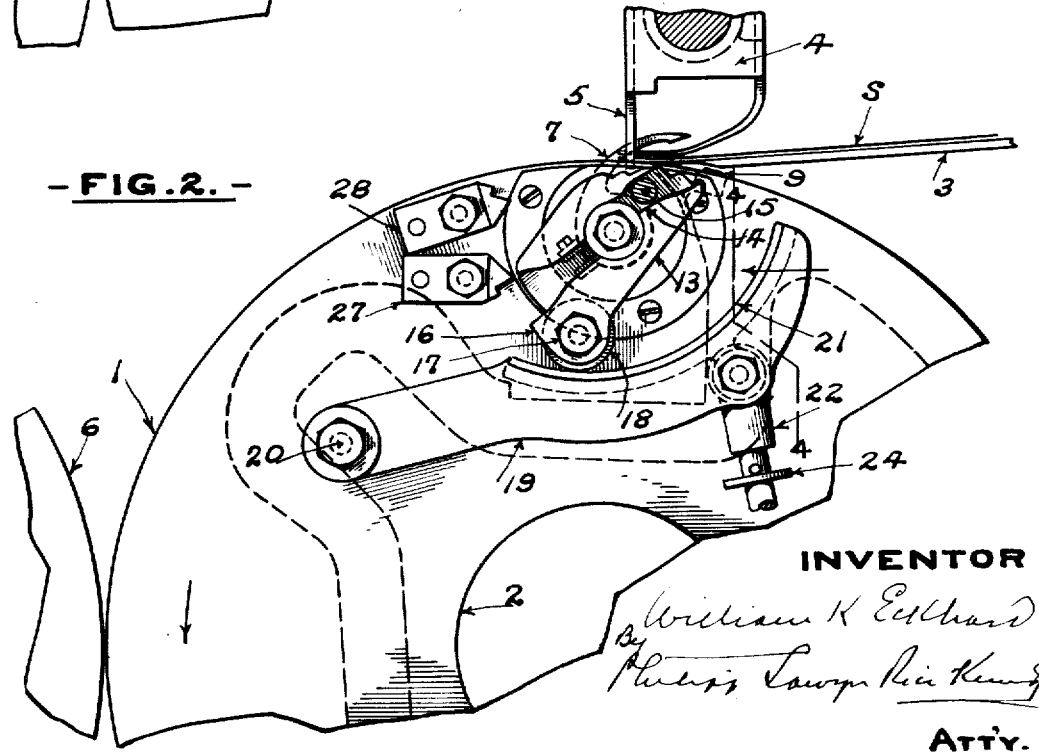

Patented May 28, 1935

2,002,853

UNITED STATES PATENT OFFICE 2,002,853

GRIPPER MECHANISM

William K. Eckhard, Dunellen, N. J., assignor to R. Hoe & Co., Inc., New York, N. Y., a corporation of New York; Irving Trust Company, permanent trustee Application October 2, 1931, Serial No. 566,485

2 Claims. (Cl. 101—411)

This invention relates to certain improvements in gripper mechanism, and particularly gripper mechanism employed with the impression cylinders of high speed printing machines.

In certain types of gripper mechanism used with printing machine impression cylinders, the grippers are operated from open to closed position by what is known as a tumbler block operated by a pin in the machine frame. This block is mounted on a shaft which has an arm to which a spring rod is pivoted, and as the block is turned, the spring is thrown alternately one way or the other past the center, thus operating the gripper finger then in open or closed position with approximately the same force or pressure.

In such constructions it is necessary that the grippers be held closed with considerable force or pressure to prevent the sheet from slipping, but only a light pressure is required to hold them open. In the prior constructions where the opening and closing pressures are about the same, a considerable amount of jar or vibration occurs when the tumbler engages its operating pin.

This jar or vibration is very objectionable, particularly when printing at high speeds as such jar to some extent arrests the motion of the impression cylinder, and effects the quality of the printing, and produces an undesirable wear and tear on the parts.

It is the especial object of the present invention to provide means for operating the tumbler block so that a sufficient pressure may be applied to the gripper fingers when closing, but a lighter pressure when opening, so that this jar or vibration is largely eliminated, the grippers closing positively and so that they do not rebound, with a consequent smoothness in operation and better register.

It is a further object of the invention to provide a simple construction of few parts, and one which is durable and easily accessible for inspection and repair.

With these and other objects not specifically, referred to the invention consists in certain novel parts, arrangements and combinations, which will be fully described in the accompanying drawings and the novel features pointed out in the claims hereunto appended.

In these drawings:—

Figure 1 is an end view partly broken away and partly in section of an impression cylinder showing the improved mechanism, the parts being shown with the grippers open;

Figure 2 is a similar view showing the grippers as closing;

Figure 3 is a similar view showing the grippers closed; and

Figure 4 is a partly broken away and partly sectional view, the view being taken on the irregular line 4—4 of Figure 2 looking in the direction of the arrow.

The particular mechanism selected to illustrate the invention is with the impression cylinder of a printing machine though it will be understood that the mechanism may, if desired be used in other relations, and that the gripper carrier may be other than a cylinder.

In the mechanism shown, however, the gripper carrier is an impression cylinder marked 1 which is mounted on a shaft 2, supported and driven in any suitable manner not shown. Sheets S are fed to this cylinder in any suitable manner, as over a table 3 against a front registry mechanism 4 of any desired character having a front stop 5, and the cooperating form or plate cylinder is shown at 6 this construction being a usual one.

In the construction illustrated the gripper fingers 7 are carried on a gripper shaft 8 and act to clamp the sheet against an abutment 9 formed on the cylinder wall. The gripper shaft is supported from the ends or heads of the cylinder as in bearings 10, 11 which if desired may be ball bearings as indicated at 12 in Figure 4.

In the present construction there is provided a tumbler block 13 fast on the gripper shaft 8 and outside the head or end of the cylinder 1 this block being provided with a slot 14 which is arranged to be engaged by a pin 15 fixed in any suitable manner relatively to the block, as in the frame of the machine. It will be observed that the slot 14 is disposed in offset relation with respect to the axis of the tumbler shaft so that both walls of the slot if projected would be tangent to circles drawn about the said axis and that the points of tangency would be on the same side of the axis; i. e., the left hand side as seen in Figure 1. Due to this arrangement, the action of the grippers in closing is such that they move initially at a relatively high speed in moving from the open position of Figure 1 towards the closed position of Figure 3, and this speed is gradually decelerated so that they move at a relatively slow speed as they close, thereby avoiding any tendency to bounce or produce vibrations which would affect the registration of the printing. The engagement of this pin rocks or tumbles the block so as to cause a rocking movement of the gripper shaft to open or close the grippers.

In accordance with the present invention this movement of the block is so controlled that a light pressure is exerted on it during the opening movement of the grippers and a relatively heavier one during the closing movement. While this may be effected in various ways there is provided, in the preferred construction what may be termed a shifting leverage mechanism, which acts to vary the pressure on the block.

This mechanism may be varied somewhat in its details. As shown, one side 16 of the block has, secured thereto, as by a bolt 17, a roll 18, which turns with the tumbler. Located below this roll is a lever arm 19, pivoted at 20 to the cylinder head, the outer end of this arm having a curved operating face 21. Secured near the outer end of the curved face of the lever arm is one end of a spring rod construction 22, the other end of the rod sliding in a bracket 23 secured to the cylinder head, upper and lower thrust collars 24, 25 being provided for the spring 26. The spring therefore has a tendency to exert an upward pressure on the lever arm 19 and so through the roll 18 to the block.

Referring now to Figures 1 to 3 the operation of the mechanism will be clear. In Figure 1 the grippers are in the open position and the tumbler pin 15 has just entered the slot 14 in the tumbler block. In this position the spring pressed lever arm 19 exerts but little force or pressure on the block, due to the distance of the roll from the pivot 20.

In Figure 2 the pin has moved into the slot, rocked the tumbler block and the gripper fingers have started to close in on the sheet and the roll 18 has moved along the curved face of the lever arm and more pressure is being exerted on the block.

In Figure 3 the tumbler pin 15 is leaving the slot, and the roll 18 has moved the extent of its travel on the curved face of the lever toward the pivot point 20. In this position the lever arm acts with considerable pressure against the roll, due to the change in the leverage, because of the roller having moved close to the pivot point. Thus the grippers are held closed with a strong pressure, but when in open position a relatively lighter pressure is exerted, and no jar or vibration results when the tumbler block engages the operating pin.

The offsetting of the slot 14 in combination with the action of the lever arm allows the gripper shaft to be started on its closing motion quickly against a minimum spring pressure, and at the finish of the stroke it turns slowly and a maximum closing pressure is applied. The continuous surface 21 over which the roller 18 travels insures the smooth acceleration and smooth final closing of the grippers in operation.

It will be understood that a similar mechanism (not shown) may be employed for opening the grippers to release the sheet.

If desired stops 27, 28 may be employed for limiting the movement of the block in either direction.

With the mechanism shown and described a very efficient mechanism has been provided for operating gripper mechanism of the type herein described, and while the invention has been shown in its preferred form, it will be understood that changes and variations may be made in the specific construction disclosed without departing from the invention.

What is claimed is:

1. In a gripper mechanism of the character described, the combination of a frame, a rotary gripper carrier, a gripper shaft eccentrically and rotatably mounted on the carrier, a tumbler block secured to the said gripper shaft for turning same to open and close the grippers, a pin fixed to said frame and coactable with said tumbler block to turn same when the carrier rotates, a roller secured to the tumbler block, a lever arm pivotally mounted on the carrier, a spring rod connected to said lever arm and carrier for pressing the lever arm into engagement with the roller, said lever arm having a single arcuate operating face on which the roller rides, and means including a plurality of stops fastened in spaced relation on said carrier and directly engaging said tumbler block, for confining the movement of the tumbler block within predetermined limits.

2. In a gripper mechanism, the combination of a gripper carrier, a gripper shaft, a tumbler block on the shaft having pin engaging slots, one of said slots being offset and tangentially positioned with respect to an axial projection of the shaft whereby a relatively slower motion is imparted to the grippers as they near the end of their closing stroke, a roll on the block, and a spring biased pivoted lever having a continuously curved surface for engagement by the roll.

WILLIAM K. ECKHARD.